Patented May 22, 1945

2,376,796

UNITED STATES PATENT OFFICE 2,376,796

REACTION PRODUCT OF ALKYLENEIMINE WITH AMMONIUM THIOCYANATE

Roger A. Mathes, Akron, Ohio, assignor to The B. F. Goodrich Company, New York, N. Y., a corporation of New York No Drawing. Application June 9, 1943, Serial No. 490,220

2 Claims. (Cl. 260—583)

This invention relates to the reaction products of alkyleneimines with ammonium thiocyanate.

These products, the structure of which is not definitely known, are useful as accelerators for the vulcanization of rubber, and also as activators for other accelerators, such as the mercaptobenzothiazoles or the mercaptoalkylthiazoles. Only small amounts of my new products are necessary to achieve the desired results, either as activators or as accelerators. In general, from 0.1 to 5.0% or more, based on the rubber composition, may be used.

It has been found that alkyleneimines react, even at room temperature, with ammonium thiocyanate with the liberation of ammonia to form products of varying molecular weight, depending upon the amount of alkyleneimine employed. It appears that some sort of polymerization-type reaction occurs if more than one molecular proportion of the alkyleneimine is used for each molecular proportion of ammonium thiocyanate. It has been found that from one to five or ten or even more molecular proportions of the alkyleneimine may be reacted with one molecular proportion of ammonium thiocyanate. All of these products have closely related chemical properties, all are accelerators for the vulcanization of rubber, and all are activators for mercaptothiazoles.

The alkyleneimines which may be used to make the products of my invention include not only ethyleneimine, propyleneimine, etc., but also the homologous hydrocarbon-substituted ethyleneimines, propyleneimines, and the like.

As specific examples of my invention, the following descriptions will serve more fully to illustrate my invention.

Example I

To a solution of 38 g. of ammonium thiocyanate in 100 cc. of methanol was added slowly and with stirring over a period of about one-half hour a solution of 21.5 g. of ethyleneimine in 100 cc. of methanol. Stirring was continued for an additional hour, the temperature of the reaction mixture rising from 28° C. at the beginning of the addition to as high as 49° C., and ammonia being liberated. Cooling is desirable to prevent the temperature from rising so high that the reaction becomes violent. After about an hour the mixture may be heated to the reflux temperature (c. 65° C.) in order to ensure completion of the reaction. The methanol may then be removed by evaporation. There were obtained about 53 g. of a viscous dark-colored syrup which was practically insoluble in ether, and could not be distilled even at reduced pressure without decomposition.

Example II

To a solution of 19 g. of ammonium thiocyanate in 75 cc. of methanol was added slowly and with stirring a solution of 43 g. of ethyleneimine in 150 cc. of methanol over a period of about one hour. The temperature rose steadily from 23° to about 37° C. during the course of the addition, and a considerable amount of ammonia was evolved. After completion of the addition, the reaction mixture was heated at reflux temperature for about an hour to complete the reaction. The methanol was then removed by evaporation at reduced pressure, leaving about 57 g. of a viscous dark-colored liquid product.

Example III

About 2.28 g. of ammonium thiocyanate was dissolved in 25 cc. of methanol. To this solution there was added over a period of about 15 minutes at a temperature of about 25° to 35° C. a solution of 10.32 g. of ethyleneimine in 10 cc. of water, during which time considerable heat and ammonia gas was evolved. The reaction mixture was then allowed to stand in an open container for several hours at room temperature, and was subsequently heated at 50° to 70° C. until no more weight was lost. About 10.9 g. of a viscous dark-colored product was obtained, indicating that approximately seven molecular proportions of ethyleneimine had reacted with one of ammonium thiocyanate.

Example IV

Over a period of about 15 minutes at a temperature of 20° to 35° C. there was added to a solution of 2.28 g. of ammonium thiocyanate in 25 cc. of methanol a solution of 20.64 g. of ethyleneimine in 20 cc. of methanol. After the completion of the addition the mixture was allowed to evaporate several hours at room temperature, and was then warmed until the weight became constant at 19.4 g., indicating that approximately 14 molecular proportions of ethyleneimine had reacted with one of ammonium thiocyanate. The product was a dark viscous liquid.

As an indication of the accelerating power of these compounds, I shall describe the effect produced in rubber by the product of Example I. The following rubber composition, in which the parts are by weight, was prepared:

| | |
|---|---|
| Rubber | 100 |
| Zinc oxide | 5 |
| Lauric acid | 2 |
| Sulfur | 3 |
| Product of Example I | 1 |

After vulcanization in a press at 287° F. the composition had the physical properties shown in the following table, in which T is the ultimate tensile strength in lb.-sq. in. and E is the ultimate elongation in per cent:

| Time of vulcanization in min. | T | E |
|---|---|---|
| 15 | 1,720 | 950 |
| 30 | 2,330 | 900 |
| 60 | 2,750 | 835 |
| 90 | 2,820 | 820 |
| 120 | 2,940 | 810 |

Equally good results may be obtained using other similar products, prepared as described above.

These new products are quite stable and are capable of being stored for long periods of time at room temperature without deterioration.

Although I have described the preparation of these products carried out at room temperature and at atmospheric pressure, higher temperatures and pressures may be employed if desired; however, there appears to be no advantage in employing such higher temperature and pressure. In general, it is found that the boiling point of the particular alkyleneimine employed, at atmospheric pressure, is a sufficiently high temperature to ensure completion of the reaction within a reasonable time.

Although I have herein disclosed specific embodiments of my invention, I do not intend to limit myself solely thereto, but only to the extent indicated in the appended claims.

I claim:

1. The product prepared by reacting one molecular proportion of ammonium thiocyanate with at least one molecular proportion of an alkyleneimine, with the liberation of ammonia, at a temperature below about 70° C.

2. The product prepared by reacting one molecular proportion of ammonium thiocyanate with at least one molecular proportion of ethyleneimine, with the liberation of ammonia, at a temperature below about 70° C.

ROGER A. MATHES.